United States Patent [19]
Joo et al.

[11] Patent Number: 6,023,140
[45] Date of Patent: Feb. 8, 2000

[54] METHOD AND APPARATUS FOR DETECTING A ROTOR POSITION IN A DISC-BASED STORAGE MEDIA AND DRIVING SAME

[75] Inventors: Sung-jun Joo; Heui-wook Kim, both of Seoul, Rep. of Korea

[73] Assignee: Samsung Electronics, Co., Ltd., Suwon, Rep. of Korea

[21] Appl. No.: 09/190,951

[22] Filed: Nov. 12, 1998

[30] Foreign Application Priority Data

Nov. 12, 1997 [KR] Rep. of Korea ................. 97-59412

[51] Int. Cl.[7] ................................................. H01R 39/46
[52] U.S. Cl. ................. 318/439; 318/560; 360/97.01; 360/99
[58] Field of Search ............................ 360/97.01, 99; 318/439, 560

[56] References Cited

U.S. PATENT DOCUMENTS 4,306,259   12/1981  Saito et al. ............................ 360/99
4,874,976   10/1989  Ohsawa et al. ..................... 360/97.01

*Primary Examiner*—Karen Masih
*Attorney, Agent, or Firm*—Marger Johnson & McCollom, P.C.

[57] ABSTRACT

A magnetic disc which can easily detect the pole position of a brushless DC motor at a standstill, a magnetic disc apparatus employing the magnetic disc and a motor driving method are provided. The magnetic disc includes a first plane and a second plane opposite to the first plane on/from which data is recorded or the recorded data is read. Each plane is provided with a data recording zone where data is stored and a parking zone. A pole information recording zone, disposed between the data recording zone and the parking zone on at least one side of the first and second planes of the magnetic disc, stores the information of a motor pole. This information indicates the rotation position of a brushless DC motor at a start-up time and is used during the start-up phase to begin rotating the motor in the proper direction so as not to damage the disc.

19 Claims, 3 Drawing Sheets

METHOD AND APPARATUS FOR DETECTING A ROTOR POSITION IN A DISC-BASED STORAGE MEDIA AND DRIVING SAME

BACKGROUND OF THE INVENTION

Field of the Invention

The present invention relates to a disc-based storage media, and more particularly, to an improved apparatus and method for determining the rotor position and driving such a device.

Computer systems often employ disc-based storage media to store and then retrieve data responsive to calls from the computer operating system. Conventional examples of such media include hard drives or floppy drives which store data to and retrieve data from the disc using a magnetic head positioned adjacent the magnetic disc. A brushless DC motor is widely used as the motor for rotating such a disc. The brushless DC motor includes a stator and a rotor having at least one permanent magnet. The motor is driven using an electromagnetic force generated by providing a current to a stator pole facing the rotor. In this case, it is necessary to detect the position of the rotor pole so that the electromagnetic force works effectively on the rotor pole. To this end, a detector directly fixed on a rotor shaft is used. A semiconductor switching device, such as a transistor or a thyristor, is turned on or off thus determining the commutation state according to the detected position of the rotor pole. Accordingly, torque for rotating the motor is continuously generated.

Various methods for detecting the position of a rotor pole have been proposed. Among them, a method using a hall sensor which is small and practical is most widely known. However, the hall sensor has a poor temperature characteristic and a defect ratio higher than a transistor.

Thus, currently, instead of using the hall sensor, a method for determining the position of a rotor pole by directly or indirectly detecting a back EMF (electromotive force) generated from the motor is widely used. Such methods are disclosed in U.S. Pat. No. 5,382,889, entitled "Self-commutating, back-EMF, brushless DC motor controller" by Peters et. al, and U.S. Pat. No. 5,028,852, entitled "Position detection for a brushless DC motor without hall effect device using time differential method" by Dunfield et. al.

In the aforementioned methods, the position of a rotor pole is estimated by measuring a voltage generated when a spindle motor rotates. Rotation of the spindle motor causes a back EMF or current to flow along the winding of a stator, thereby causing the motor to rotate in a predetermined direction.

However, according to those conventional methods, it is difficult to rotate the motor in a predetermined direction during an initial start-up stage of the motor because there is little information on the position of the rotor pole. In other words, in a state where the motor rotates, since a large voltage is generated, it is possible to control the motor to rotate in a predetermined direction by detecting the position of the rotor pole. However, since little voltage is generated at the start-up time of the motor, it is difficult to control the motor to rotate if in a proper direction.

In magnetic disc-based media, it is very important to rotate the disc in a proper direction during the initial start-up stage of the motor. If the disc rotates reverse to its normal direction, the disc can be scratched, thus damaging the surface of the disc. Furthermore, the start-up time of the motor increases if the disc is initially rotated in the wrong direction. This is because a voltage must be applied again to first stop the motor from rotating in the wrong direction, and then rotate the motor in the correct direction. Thus, a motor start-up circuit should be constructed so that a proper rotational direction can be determined by detecting the position of the rotor pole before starting up the motor. The motor start-up circuits which have been known up to now have been very complicated, which is an impediment to achieving light motor driving ICs.

Accordingly, the need exists for a simple method and apparatus for determining the proper rotational position and direction of the rotor pole and driving such a rotor pole.

SUMMARY OF THE INVENTION

To solve the above problems, it is an object of the present invention to store motor start-up information on the magnetic disc-based storage media.

It is still another object of the present invention to provide a motor driving method for the disc-based storage apparatus.

To accomplish the first object of the present invention, there is provided a disc-based storage media having a first plane and a second plane opposite to the first plane on/from which data is recorded or the recorded data is read. Each plane includes a data recording zone where data is stored and a parking zone. At least one side of the first and second planes includes a pole information recording zone where the position information of a motor pole, indicating the rotation direction of a brushless DC motor at a start-up time, is recorded. In a preferred embodiment, the pole information recording zone is provided between the data recording zone and the parking zone.

The disc-based storage medium, according to another aspect of the invention, comprises a disc having a first plane and an opposing second plane each having a data recording zone for storing data thereon. An electric motor coupled to the disc rotates the disc about an axis transverse to the first and second planes. The motor includes a rotor pole rotatable in response to an electric field applied to the rotor pole. A data reading/recording head positioned adjacent the first and second planes is adapted to read and/or write data to the disc. A pole information recording zone is disposed on at least one of the first or second planes of the disc for recording data reflective of a position of the rotor pole.

The invention also comprises a method for driving an electric motor of a disc-based storage medium having a rotating rotor pole. The method comprises the steps of recording pole information on the disc-based storage medium responsive to a detected rotational position of the electric motor's rotor pole. The pole information is then read from the disc-based storage medium at a start-up time of the motor. The motor is initially rotated responsive to the pole information and a voltage generated by the rotation of the motor is detected. The position of the rotor pole can then be estimated using the detected voltage and, if the velocity of the motor reaches a predetermined level after being started up, the motor can be driven using the estimated position of the rotor pole.

As described above, there is provided a pole information recording zone where the motor pole information is recorded on at least one surface. Therefore, since the position of the motor pole is simply determined even when the motor stops, it is easy to rotate the motor in a predetermined direction at the start-up time of the motor.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT(S)

Figure 1:
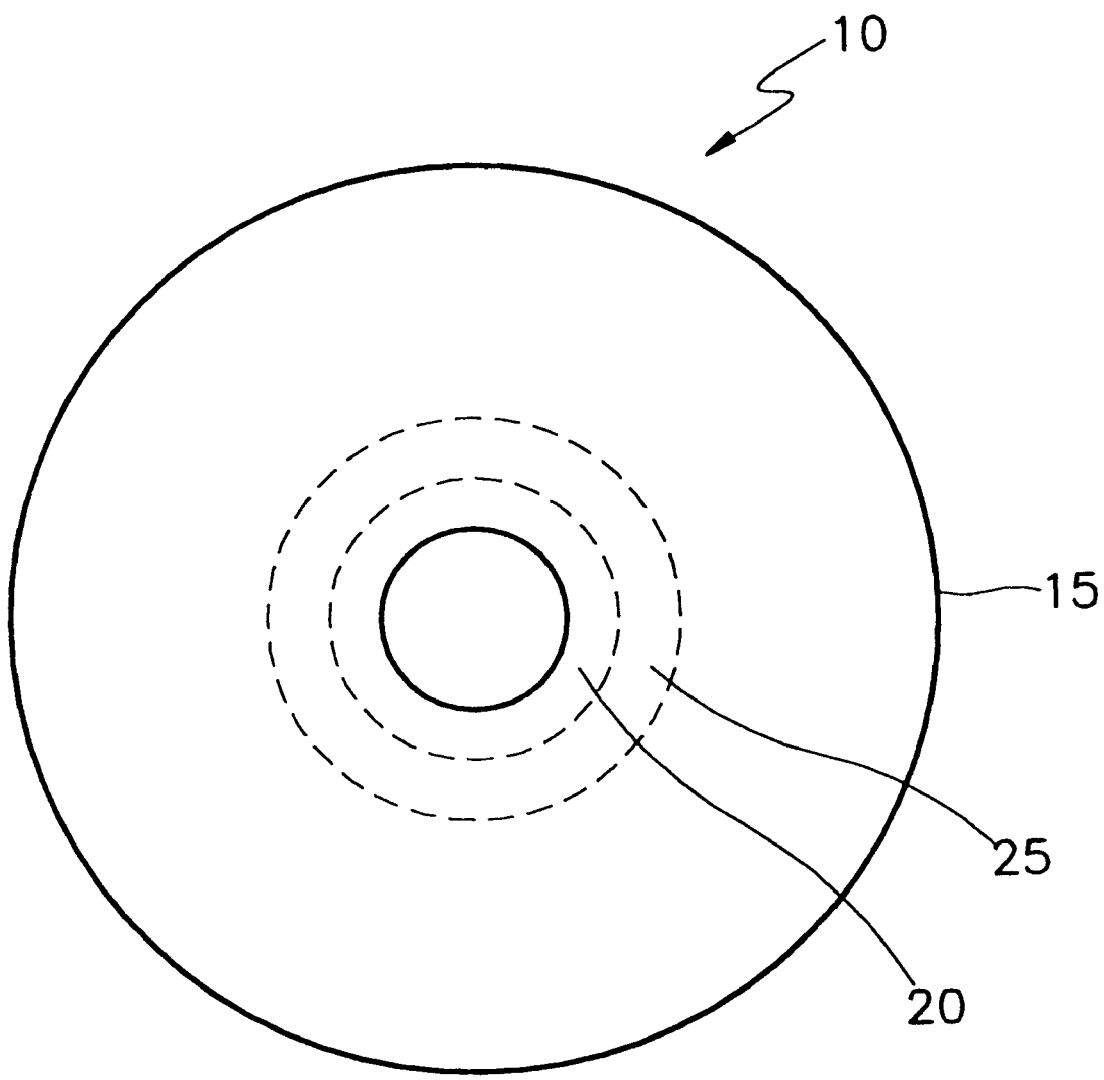
FIG. 1 is a schematic diagram of a magnetic disc constructed according to a preferred embodiment of the present invention.

The present invention will be described in detail through a preferred embodiment with reference to accompanying drawings. Though the preferred embodiment refers to magnetic-based devices, it is understood that other disc-based storage media such as laser-based disc storage media can utilized the teachings of the present invention. Throughout the drawings, the same reference numerals indicate the same elements.

FIG. 1 is a schematic diagram of a magnetic disc 10 constructed according to a preferred embodiment of the present invention. In the disc, a pole information recording zone 25, where information on the position of a motor pole is to be recorded, is provided between a data recording zone 15 where data is stored, and a parking zone 20.

In the pole information recording zone 25, at least one track adjacent to the parking zone 20 is allocated for storing information on the position of a rotor pole constituting a motor for rotating the magnetic disc. Therefore, in starting up the motor, the position of the motor pole is detected by reading the start-up information recorded on the pole information recording zone 25 using a magnetic head. The information of the detected position is supplied to a motor driver to determine the commutation state and thus rotate the motor in a predetermined direction.

The magnetic disc 10, such as a hard disc or a floppy disc, includes first and second planes. These are typically constructed of an aluminum or plastic circular plate with the upper and lower surfaces being coated with a magnetic material for use as a storage medium. The pole information recording zone 25 of the present invention may be on either side of the first and second planes, and a preferred embodiment thereof is shown in FIGS. 2A and 2B.

Figure 2B:
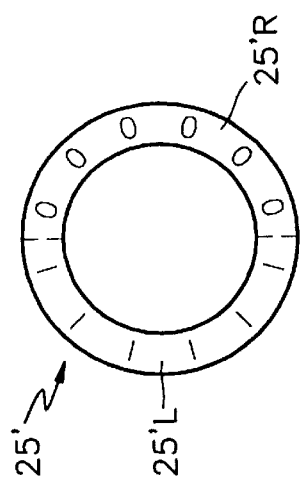
FIGS. 2A and 2B illustrate states in which pole information is recorded on first and second planes of the magnetic disc, respectively.
Figure 2A:
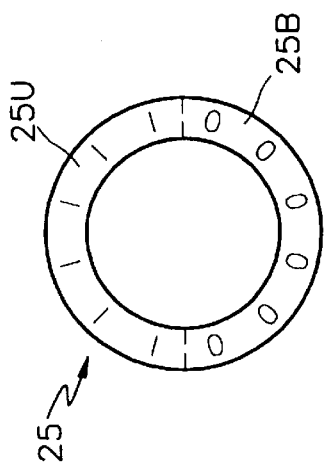

FIGS. 2A and 2B illustrate states in which pole information is recorded on first and second planes of the magnetic disc, respectively. The N-pole information is designated by "1" and S-pole information is designated by "0," for the sake of convenience.

In a preferred recording scheme, when a first pole information recording zone 25 positioned on the first plane of a magnetic disc is viewed face-on, the N-pole information is recorded on an upper side 25U thereof and the S-pole information is recorded on a bottom side 25B thereof. Also, when a second pole information recording zone 25', positioned on the second plane of a magnetic disc opposite to the first plane, is viewed face-on, the N-pole information is recorded on a left side 25' L thereof and the S-pole information is recorded on a right side 25' R thereof. In this case, as described above, the pole information identifying the rotor pole position is recorded on the first and second pole information recording zones 25 and 25'.

Figure 3:
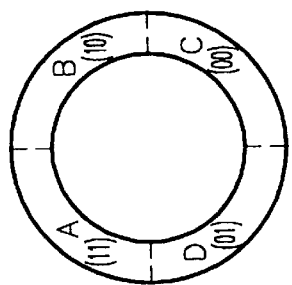
FIG. 3 illustrates rotor pole position information readable when the pole information is recorded as shown in FIGS. 2A and 2B.

FIG. 3 illustrates pole information readable when the pole information is recorded as shown in FIGS. 2A and 2B, in which the pole information recording zone is partitioned into A, B, C and D sectors. The information on four positions of the rotor pole can be obtained by scanning the first and second pole information recording zones 25 and 25' where the rotor pole information is recorded. For example, in the case when the information recorded on the first and second pole information recording zones 25 and 25 reads as "11," it is determined that the rotor pole is positioned on the "A" sector. In the cases of "10," "00" and "01," it is determined that the rotor pole is positioned on the "B," "C," and "D" sectors, respectively.

Figure 4:
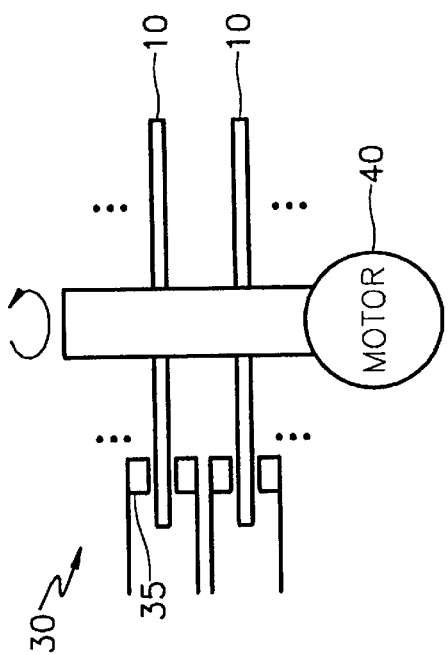
FIG. 4 is a schematic diagram of a magnetic disc apparatus constructed according to a preferred embodiment of the present invention.

FIG. 4 is a schematic diagram of a magnetic disc apparatus constructed according to a preferred embodiment of the present invention. The magnetic disc apparatus 30 includes a magnetic head 35, at least one magnetic disc 10 where data is recorded and the recorded data is read, and a motor 40 for rotating the magnetic disc 10.

The rotor information is recorded just once in the course of fabricating a hard disk drive, immediately after a disk is coupled to a motor. The rotor information is not recorded while the disk rotates. After the disk is coupled to the motor, the absolute position of a motor pole is determined on the disk. The rotor information is stored by designating "0" s and "1" s on the sector of the disk as in FIGS. 2A and 2B corresponding to the absolute position of the motor pole. Once information is recorded, the hard disk drive can be controlled using the recorded information.

The number of magnetic discs 10 associated with the storage device is determined according to the capacity of the computer. According to the present invention, the more magnetic discs 10 used, the more exactly the position of the motor pole can be determined. For example, in the case of a magnetic disc apparatus in which two magnetic discs are used, the apparatus has four planes on which the pole information can be recorded. That is, each first and second planes of first and second magnetic discs. By combining of the information recorded on each plane, the information for eight positions of the rotor pole can be obtained. The upper, lower, left and right sides of the second disc, however, are rotated by 45° relative to the first disc to yield eight possible zones when information from the four sides on the two disks is combined.

The method for driving a motor 40 using the magnetic disc apparatus 30 will now be described as follows.

At an initial motor start-up time, the position of the motor pole is detected by using a magnetic head 35 to read the position information of the pole that was recorded on the pole information recording zone of the magnetic disc 10. The magnetic head, e.g., and MR head, reads the data bit immediately below itself in a static state. The motor is started up by supplying this information to a circuit responsible for the start-up of the motor. Also, when the velocity of the disc motor reaches a predetermined level after start-up, the position of the motor pole is determined by detecting the voltage generated by the rotation of the motor. The motor can then be driven using this information if the voltage is large enough.

Now, the method for driving the motor using the information obtained from the pole information recording zone will be described with reference to FIG. 5.

Figure 5:
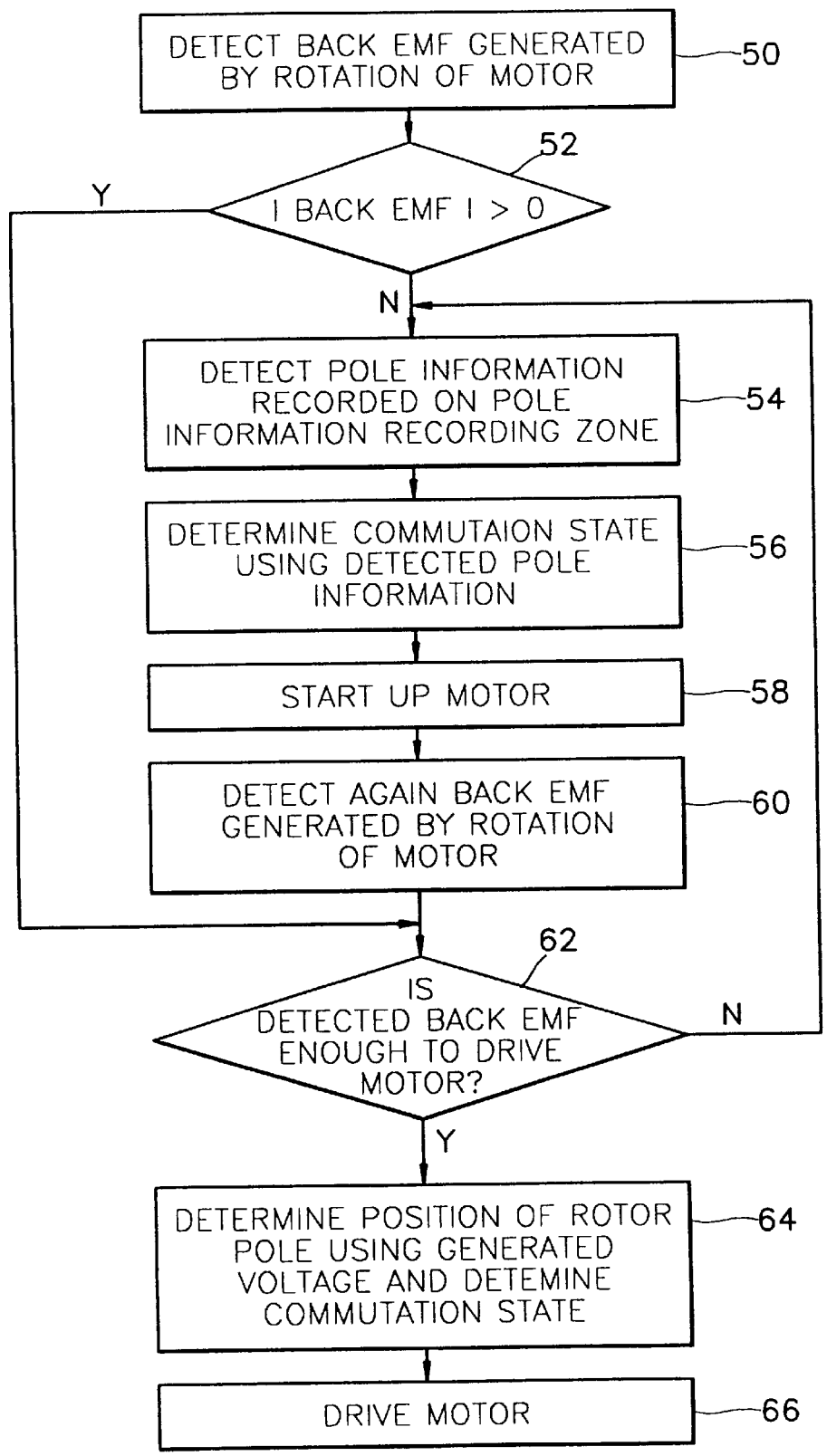
FIG. 5 is a flow diagram showing a method for driving a motor and for rotating a magnetic disc using the information obtained from the pole information recording zone shown in FIG. 1.

As shown in FIG. 5, first, a back EMF generated by a rotating motor is detected (step 50), and it is determined whether the detected back EMF is generated or not (step 52). If the back EMF is not detected, which implies that the motor is stopped, the position information of the rotor pole is detected by reading the information recorded on the pole information recording zone (25 of FIG. 1) positioned on at least one side of the magnetic disc (step 54). The commutation state of the motor is then determined using the detected position information of the rotor pole (step 56). The motor is then started up according to the determined commutation state.

Subsequently, the back EMF generated by the rotation of the motor is detected again (step 60). It is then determined whether the detected back EMF is enough to control the motor (step 62). If it is determined that the back EMF is enough, the position of the rotor pole and commutation state of the motor is determined using the generated voltage (step 64), and then the motor is driven (step 66).

If it is determined that the detected back EMF is not enough to control the motor, the procedure returns to step 54.

In step 52 which determines whether the back EMF is detected or not, if the back EMF is detected (implying that the motor is rotating), step 62 (determining whether the detected voltage is enough to control the motor) and subsequent steps are progressed.

Although the present invention has been described through a preferred embodiment, the invention is not limited thereto and it is evident that various modifications and changes may be effected by one skilled in the art within the scope of the invention.

As described above, the magnetic disc of the present invention has a pole information recording zone on which motor pole position information is recorded on at least one plane thereof. Even when the motor stops, the position of the motor pole can be determined. Therefore, since it is easy to rotate the motor in a predetermined direction at a start-up time of the motor using the present invention, there is little probability of failing in starting up the motor. Also, since a circuit for determining the position of the motor pole at the start-up time is simplified, a light driving IC used in driving the motor can be attained.

What is claimed is:

1. A disc-based storage medium comprising:
   a disc having a first plane and an opposing second plane each having a data recording zone for storing data thereon;
   an electric motor coupled to said disc for rotating the disc about an axis transverse to said first and second planes, said motor including a rotor pole rotatable in response to an electric field applied to said rotor pole;
   a data reading/recording head positioned adjacent said first and second planes for reading and/or writing data to said disc; and
   a pole information recording zone disposed on at least one of the first or second planes of the disc for recording data reflective of a position of the rotor pole.

2. The disc-based storage system according to claim 1, further including a parking zone, wherein the pole information recording zone is provided between the data recording zone and the parking zone.

3. The disc-based storage system according to claim 1, wherein the data recorded on the pole information recording zone specifically identifies the position of the rotor pole.

4. The disc-based storage system according to claim 1, the disc including a first pole information recording zone of the first plane of the disc and a second pole information recording zone on the second plane of the disc.

5. The disc-based storage system according to claim 4, wherein said first pole information recording zone includes left and right binary zones reflective of whether said rotor pole is at a right or left zone with respect to the disc, and said second pole information recording zone includes upper and lower binary zone reflective of whether said rotor pole is at an upper or lower zone with respect to the disc, the combined data from the first and second pole information recording zones indicating which quarter of the disc the rotor pole is adjacent to.

6. The disc-based storage system according to claim 5, further including a second disc parallel to said first disc, said second disc including a first plane having a third pole information recording zone defined thereon, and an opposing second plane having a fourth pole information recording zone defined thereon.

7. The disc-based storage system according to claim 6, wherein said third pole information recording zone includes left and right binary zones rotated 45° from the left and right binary zones, respectively, of said first pole information recording zone, said fourth pole information recording zone including upper and lower binary zones rotated 45° from the upper and lower zones, respectively, of the second pole information recording zone, wherein data from said first, second, third and fourth zones combined define a total of eight possible positions of the rotor pole.

8. The disc-based storage system according to claim 1, wherein said reading/recording head is a magnetic head.

9. The disc-based storage system according to claim 1, wherein said reading/recording head includes a laser output for directing optical energy at said disc and a reflective reading head for reading reflected optical energy from said disc.

10. The disc-based storage system according to claim 1, wherein said motor is a brushless DC motor.

11. A method for driving an electric motor of a disc-based storage medium having a rotating rotor pole, the method comprising the steps of:
    recording pole information on the disc-based storage medium responsive to a detected rotational position of the electric motor's rotor pole;
    reading the pole information from the disc-based storage medium at a start-up time of the motor;
    initially rotating the motor responsive to said pole information;
    detecting a voltage generated by the rotation of the motor;
    estimating the position of the rotor pole using the detected voltage if the velocity of the motor reaches a predetermined level after being started up; and
    driving the motor using the estimated position of the rotor pole.

12. The motor driving method according to claim 11, wherein the step of initially rotating the motor comprises the steps of:
    determining whether a back EMF (Electro Motive Force) is generated by the rotation of the motor;
    detecting the motor pole position information recorded on the pole information recording zone positioned on at least one plane of the disc-based storage medium if the back EMF is not generated; and
    determining the commutation state of the motor using the detected motor pole position information to thus start up the motor.

13. The motor driving method according to claim 12, wherein the step of driving the motor comprises the steps of:

detecting again the back EMF generated by the rotation of the motor;

determining whether the detected back EMF is enough to drive the motor; and determining the position of the motor pole using the detected back EMF if the detected back EMF is enough to drive the motor, to thus drive the motor.

14. The motor driving method according to claim 12, wherein the step of driving the motor comprises the steps of:

detecting again the back EMF generated by the rotation of the motor;

determining whether the detected back EMF is enough to drive the motor; detecting the motor pole position information recorded on the pole information recording zone positioned on at least one plane of the magnetic disc if the detected back EMF is not enough to drive the motor; and determining the commutation state of the motor using the detected motor pole position information, to thus start up the motor.

15. The motor driving method according to claim 11, wherein the step of initially rotating the motor comprises the steps of:

determining whether the back EMF is generated by the rotation of the motor;

determining whether the detected back EMF is enough to drive the motor if the back EMF is generated; and determining the position of the motor pole using the detected back EMF if the detected back EMF is enough to drive the motor, to thus drive the motor.

16. A magnetic disc comprising:

a first plane and a second plane opposite to the first plane on/from which data is recorded or the recorded data is read, each plane being provided with a data recording zone, where data is stored, and a parking zone; and a pole information recording zone defined on at least one side of the first and second planes of the magnetic disc where the position information of a motor pole, indicating the rotation direction of a brushless DC motor at a start-up time, is recorded, wherein the pole information recording zone is provided between the data recording zone and the parking zone.

17. The magnetic disc according to claim 16, wherein at least one track adjacent to the parking zone is provided in the pole information recording zone, the track including motor pole position information recorded on the pole information recording zone.

18. The magnetic disc according to claim 16, wherein the information recorded on the pole information recording zone is recorded in binary codes.

19. The magnetic disc according to claim 16, wherein the pole information is recorded on the pole information recording zone positioned on the first and second planes so that the information for four positions of a rotor pole can be obtained by the combination of the pole information recorded on the surface thereof.

* * * * *